US008018854B1

(12) United States Patent
Curtis (10) Patent No.: US 8,018,854 B1
(45) Date of Patent: Sep. 13, 2011

(54) FACILITY AND EQUIPMENT TESTING FOR PACKET NETWORKS (75) Inventor: John C. Curtis, Spring Lake Heights, NJ (US)

(73) Assignee: Eastern Research Inc., Moorestown, NJ (US)

( * ) Notice: Subject to any disclaimer, the term of this patent is extended or adjusted under 35 U.S.C. 154(b) by 1013 days.

(21) Appl. No.: 11/418,173

(22) Filed: May 3, 2006

Related U.S. Application Data (60) Provisional application No. 60/677,224, filed on May 3, 2005.

(51) Int. Cl.
  *G01R 31/08* (2006.01)
  *G06F 11/00* (2006.01)
  *G06F 15/173* (2006.01)
  *H04J 1/16* (2006.01)
  *H04L 1/00* (2006.01)
  *H04L 12/28* (2006.01)

(52) U.S. Cl. .................. 370/241; 370/401; 709/239

(58) Field of Classification Search .................. 370/392, 370/241, 248, 250, 400, 401, 242, 245; 709/239
  See application file for complete search history.

(56) References Cited

U.S. PATENT DOCUMENTS

| | | | | | |
|---|---|---|---|---|---|
| 5,838,660 | A | * | 11/1998 | Croslin | 370/216 |
| 6,958,977 | B1 | * | 10/2005 | Mitrani et al. | 370/252 |
| 6,996,132 | B1 | * | 2/2006 | Tolety | 370/517 |
| 7,075,932 | B2 | * | 7/2006 | Matsuhira et al. | 370/395.31 |
| 7,283,465 | B2 | * | 10/2007 | Zelig et al. | 370/219 |
| 7,409,712 | B1 | * | 8/2008 | Brooks et al. | 726/22 |
| 7,535,847 | B1 | * | 5/2009 | Hansen et al. | 370/241 |
| 7,808,902 | B1 | * | 10/2010 | Pham et al. | 370/231 |
| 2002/0015387 | A1 | * | 2/2002 | Houh | 370/250 |
| 2003/0058801 | A1 | * | 3/2003 | Moore et al. | 370/250 |
| 2003/0179707 | A1 | * | 9/2003 | Bare | 370/235 |
| 2004/0224681 | A1 | * | 11/2004 | Sjostrand | 455/433 |
| 2004/0246952 | A1 | * | 12/2004 | Honda | 370/357 |
| 2005/0066053 | A1 | * | 3/2005 | McDysan | 709/243 |
| 2005/0076235 | A1 | * | 4/2005 | Ormazabal et al. | 713/201 |
| 2006/0018252 | A1 | * | 1/2006 | Sridhar et al. | 370/216 |
| 2006/0020600 | A1 | * | 1/2006 | Corl et al. | 707/10 |
| 2006/0047851 | A1 | * | 3/2006 | Voit et al. | 709/239 |
| 2006/0126495 | A1 | * | 6/2006 | Guichard et al. | 370/216 |
| 2006/0164975 | A1 | * | 7/2006 | Filsfils et al. | 370/225 |
| 2007/0104197 | A1 | * | 5/2007 | King | 370/392 |
| 2007/0291652 | A1 | * | 12/2007 | Oyamada | 370/250 |

OTHER PUBLICATIONS

Cisco Systems, http://www.cisco.com/univercd/cc/td/doc/product/ong/600_sdh/sdh60014/14sdhtl1.pdf, undated.
*NAA and the Digital Cross-Connect*, Digital Lightwave, Inc., pp. 1-7, 1999.

(Continued)

*Primary Examiner* — Ayaz R Sheikh
*Assistant Examiner* — Hoang-Chuong Q Vu
(74) *Attorney, Agent, or Firm* — Lerner, David, Littenberg, Krumholz & Mentlik, LLP (57) ABSTRACT

A system and method for testing packet switch networks is provided. The method comprises establishing a first network path associated with a first device and a local device. The first network path includes at least a first router, a second router, and a data link layer switch. A first route and a second route along the first network path are established. The method further includes preventing any packets received from the first device via the first route from reaching the local device, allowing packets received via the second route to reach the local device, and directing packets sent by the local device to a test set using the second static route.

13 Claims, 5 Drawing Sheets

OTHER PUBLICATIONS

Router Configuration Tutorial, http://www.alliancedatacom.com/manufacturers/cisco-systems/routers/configuration_tool.pdf, undated.

Stolins, Craig, *Circuit Emulation over ATM*, www.williamson.cx/atm-ces.html, Mar. 21, 2005.

* cited by examiner

FACILITY AND EQUIPMENT TESTING FOR PACKET NETWORKS

CROSS-REFERENCE TO RELATED APPLICATIONS

This application claims the benefit of the filing date of U.S. Provisional Patent Application No. 60/677,224 filed May 3, 2005, the disclosure of which is hereby incorporated herein by reference.

BACKGROUND OF THE INVENTION

It's been over one hundred years since Alexander Graham Bell uttered those famous words that heralded the beginning of a new era in communications. During that period, the public network supporting telephonic communications, i.e., the Public Switched Telephone Network (PSTN), evolved into a labyrinth of electronic devices or equipment connected by various cable media. The electronic equipment typically includes switches, digital cross connects (DCSs), and multiplexers to name a few. The cable media typically includes copper, coaxial and fiber cable.

The PSTN primarily comprises a circuit switched network. A circuit comprises a path or timeslot through a network for carrying information. In a circuit switched network such as the PSTN, an electronic switch establishes and keeps open a circuit between two or more users, such that the users have exclusive and full use of the circuit until the circuit connection is released. As information a circuit traverses the network it is processed by the electronic equipment that comprise the network, such as, for example, digital cross-connects and multiplexers. In essence, each circuit provides a unique timeslot or path that is reserved for carrying voice or other information between origination and destination points for the duration of a call or service.

In contrast, in a packet switched network, a path is not reserved for carrying information between origination and destination points. Instead, information is placed in packets that include address information typically identifying the originating and destination point of each packet. The address information is usually placed in headers that form a part of each packet. The packets are then received by packet switches, which autonomously route the packet through the network by using routing tables to determine the next hop or destination for a packet. The routing table essentially comprises a look-up table that associates logical or physical ports on a packet switch based on address information in a packet's header.

Packet switching technology continues to rise in popularity and promises to replace the PSTN as the vehicle for supporting the very service that spawned the development of the PSTN—telephony. As packet switching increases in popularity, however, network providers and users are demanding new features to assist in making these networks more robust and reliable. Such features include the ability to test a facility or equipment connected to a packet switched network.

The PSTN, for example, supports functions that allow for testing of a facility or equipment that is part of that network. One test, for example, is called a SPLTE (split equipment). A SPLTE is normally associated with a digital cross connect (DCS) and comprises interrupting a circuit traversing the DCS so that the circuit may be connected to a test set. Once connected to the test set, the circuit is then used to test other equipment residing on the network. In contrast, a SPLTF (split facility) comprises disrupting a circuit so that a facility on the network may be tested. Additional details relating to SPLTE and SPLTF functionality in a DCS are described in Telcordia Technologies, Inc., GR-834-CORE and GR-1402-CORE, the disclosures of which are hereby incorporated herein by reference.

Implementation or emulation of these types of test functions, e.g., SPLTE and/or SPLTF, in a packet switched network present new challenges that need to be addressed. Of utility then are methods and systems for implementing or emulating these and other testing functionalities in packet switched networks.

SUMMARY

In an aspect, the present invention comprises implementing split equipment (e.g., SPLITE) and/or split facility (e.g., SPLITF) functionality in a packet based network, such as for example an Internet Protocol network (IP network).

In another aspect, the present invention is a method for testing packet switch networks. The method preferably comprises establishing a first network path associated with a first device and a local device, the first network path including at least a first router, a second router, and a data link layer switch. The method further preferably includes establishing a first static route along the first network path in the first router, the first static route referencing a first next-hop gateway associated with a first logical path to the first device and establishing a second static route along the first network path, the second static route referencing the second router as a next-hop gateway associated with the first logical path to the first device. The method further desirably includes preventing any packets received via the first static route from reaching the local device and allowing packets received via the second static route to reach the local device.

Further in accordance with this aspect of the present invention, establishing a second static route preferably includes establishing the second static route via a user command executed on the first router.

Further in accordance with this aspect of the present invention, the method preferably comprises disabling the established second static route and disabling the preventing step.

Further in accordance with this aspect of the present invention, the method further preferably comprises disabling the second static route, re-establishing the first static route and allowing any packets received via the first static route to reach the local device.

Further still in accordance with this aspect of the present invention, establishing the second static route preferably comprises retrieving a routing table from a memory.

Yet further in accordance with this aspect of the present invention, establishing the second static route preferably comprises modifying the first static route in a routing table with the second static route.

In accordance with this aspect of the present invention, the method further preferably comprises directing packets sent by the local device and destined for the first device to a test set by the second static route. Further still, the method may also comprise sending test packets from the test set to the local device using the second static route.

In another aspect the present invention may comprise an apparatus. The apparatus preferably comprises: a memory storing a first static route used for routing packets between a remote device and a local device over a first network path and a second static route used for routing packets between the remote device and the local device over a second network path; a packet filter for dropping packets received from the remote device and destined for the local device; and a processor operable to control the memory and packet filter. The processor preferably includes instructions operable to execute a method comprising: modifying the first static route with the second static route, controlling the packet filter to drop packets received from the remote device and destined for the local device, and routing packets destined for the remote device to the local device over the second static route.

In accordance with this aspect of the present invention, the apparatus may comprise a router, a host or a packet switch.

In another aspect, the present invention is a system for implementing path splitting in a packet network. The system preferably includes a first router coupled to a first host via an uplink facility, a second router coupled to the first router via a downlink facility and a switch coupled to the second router, a second host and a test set. In accordance with this aspect of the present invention, the first router preferably includes a first static route referencing a next-hop gateway in the uplink facility for communicating with the first host, a second static route that references the second router as the next-hop gateway for communicating with the first host and a filter for filtering packets received from the first host on the uplink facility. Most preferably, the switch is operable to switch information at the data link layer.

Further, in accordance with this aspect of the present invention, the functionality for implementing the first static route, the second static route and filter in the first router is done using software.

Further, in accordance with this aspect of the presenting invention, the first router appears on a first network distinct from a second network on which the second router appears. Most preferably, the first router and second host appear on the same network.

DETAILED DESCRIPTION

In a digital cross-connect (DCS) system, splits consist of re-terminating a circuit onto another port or timeslot. For example, a local device or equipment may be disconnected from a facility or given timeslot of the network. If the facility is reconnected to another device or equipment, e.g., test equipment, such a reconnection is typically referred to as a SPLITF (split facility). If the local device is to be connected to the test equipment, then such a reconnection is typically referred to as a SPLITE (spilt equipment). In an aspect, the present invention comprises implementing SPLITE and SPLITF functions in a packet based network, such as an Internet Protocol network (IP network). More particularly, in one aspect of the present invention, SPLITF functionality allows a network operator to check a facility for transporting packets between a local device and a remote device by replacing the local device connected to the facility with a test set or equipment. The test equipment may then be used to communicate with the remote device over the facility by sending, for example, test packets. If the test packets reach their destination, i.e., the remote device, that would serve as a positive indication that the facility is functional, i.e., working. If the packets did not reach their destination, this may serve as an indication that the facility is compromised.

With regard to SPLITE functionality, a network operator is allowed, via this functionality, to check the operation of a locally connected device such as host computer. Thus, in implementing SPLITE functionality, the test equipment is connected to the local device instead of the facility (as discussed above for SPLITF). In this way, the test equipment can send test packets to the local device so as to determine its operational status. For example, if the local device is able to receive the test packets, this may be an indication that the facility connected to the local device compromised. On the other hand, if the local device is unable to receive the test packets, it is usually an indication that the facility is performing as expected and that the local device's operational status is compromised somehow.

Although discussed in more detail below, the manner in which packetized data or information is transported through a packet switched network raises different challenges than those of the PSTN network. For example, in sending a packet to its final destination in a packet network, each switch autonomously sends a packet to the next hop based on its routing tables. As such, if the test equipment is to be connected to the network it has to be identified as a destination point for packets and a source of packets. The rules associated with defining routes in a router or packet switch, however, generally raise challenges as to how the test equipment can be identified on the network and have it be connected to proper facilities, remote device or local device. In that regard, in some instances neither the remote device nor the local device is accessible to the network operator.

With regard to this description, reference is made to the one or more layers of the Seven Layer Open System Interconnect Reference Model ("7-layer OSI stack") in which layer 1, the lowest layer, is the Physical Layer, layer 2 is the Data Link Layer, layer 3 is the Network Layer, layer 4 is the Transport Layer, layer 5 is the Session Layer, layer 6 is the Presentation Layer, and layer 7, the highest layer, is the Application Layer.

Figure 1:
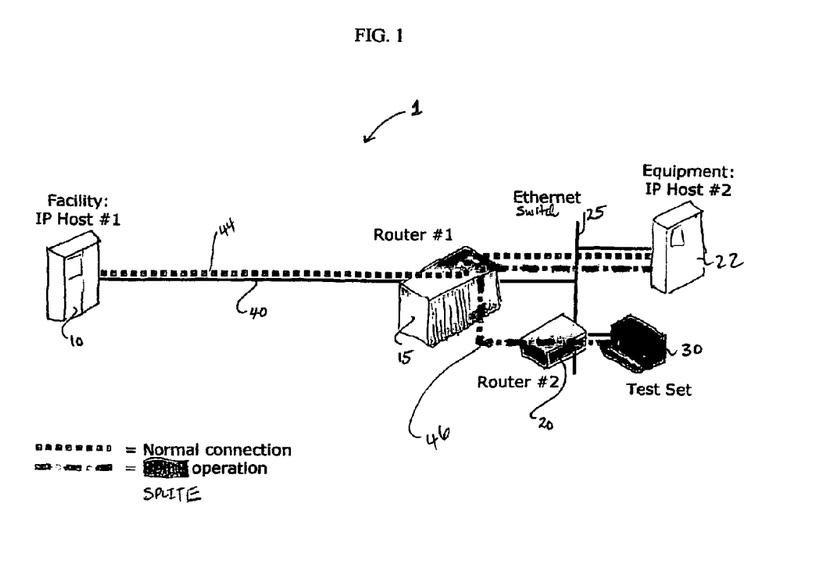
FIG. 1 illustratively depicts SPLITE functionality in packet switched network in accordance with an aspect of the present invention.

Turning now to FIG. 1, there is shown a diagram that illustrates an example of SPLITE functionality in an IP network in accordance with an aspect of the present invention. As shown, a network 1 preferably includes a first or facility/IP host 10, a first router 15, a second router 20, a second or equipment/IP host 22, an Ethernet or layer 2 switch 25, and a test set 30. In addition, the first router 15 is connected to the first or facility/IP host 10 via uplink 40. The dashed and dotted lines 44, 46 show the flow of packets or information across the network between, for example, the first host 10 and the second host 22 and the second host 22 and the test set 30. More particularly, dotted line 44 shows a normal flow of data packets between the first host 1 and second host 2 through router 15. The dotted line 46, on the other hand, shows packet data flowing in SPLITE operation. In general, in implementing the SPLITE function, the utility or functions described below disconnects first host 10 (i.e., the facility) from second host 22 (i.e., the equipment) and reconnects second host 22 to the test set 30. In this way, the test set 30 can communicate with the second host 22, e.g., by sending test packets, to determine its operational status.

Generally, a router is an OSI Layer 3 device that forwards data packets between networks. Typically, a router is connected to at least two networks, commonly at least two LANs or WANs. Routers are commonly called gateways, although the term gateway more properly applies to a device that interworks at OSI Layer 4. In general, a host is a computer or other device that is connected to, and has an address on, a network, for example, a TCP/IP network, including the Internet. In that case, each host normally has a unique IP address. A host may be a web server or other computer connected to a network, e.g., a LAN, WAN, etc. In general, a packet switch is a device that routes packets based on packet address information such as a network address, e.g., destination address.

In particular, as part of establishing SPLITE functionality, the test set 30 is given the same IP address as first or IP host 10. Therefore, the test set 30 belongs to the same network as the first or IP host 10. When the SPLITE function is enabled at the first router 15, the first router preferably forwards traffic to the test set 30 via a different route on the network. However, IP routing typically requires that routers choose a route, for example, based on a packet's destination IP address and an associated next-hop route. Therefore, routers do not typically support user configuration of their transmit ports based upon a destination IP address when both ports associated by a next-hop route share the same IP network. In other words, although one can assign a next-hop gateway/router for a network whose near IP interface shares the same IP network with the router ports, the router usually cannot determine which interface to use for sending traffic if both interfaces are on the same network.

In accordance with this aspect of the present invention, a second router 20 is introduced on an IP network that is distinct from the IP network of first or IP host 10. In particular, the second router 20 is attached to a different IP network than the network through which the first router 15 would otherwise forward traffic to IP host 10. The second network to which the second router is attached may be the same LAN segment to which the second IP host 22 is attached, and even the same IP network. The first router 15 is then preferably configured with two static routes. The first static route points to the network of IP host 10 and references the next-hop gateway on the first router's 15 uplink 40 interface. The second static route points to the IP address of IP Host 10 (but not the entire network) and references the second router 20 as the appropriate next-hop gateway to reach IP host 10's address.

Thus, when the SPLITE function is invoked in the first router 15, the route to the network of IP host 10 is retained via the uplink facility 40 using the first static route. The second static host route is then added, which indicates to router 15 that the path to IP host 10 is via the router 20. In this way, packets from IP host 22 traverse router 15 and router 20 on their way to the test set 30. In order to prevent queries and responses from IP host 10 from reaching IP host 22, the first router is also equipped with a filter that blocks (i.e., drops) packets received from IP host 10 on the uplink 40 interface and destined for IP host 22. The filter, however, would allow packets from the test set 30 reach their destination point, i.e., IP host 22.

Figure 2:
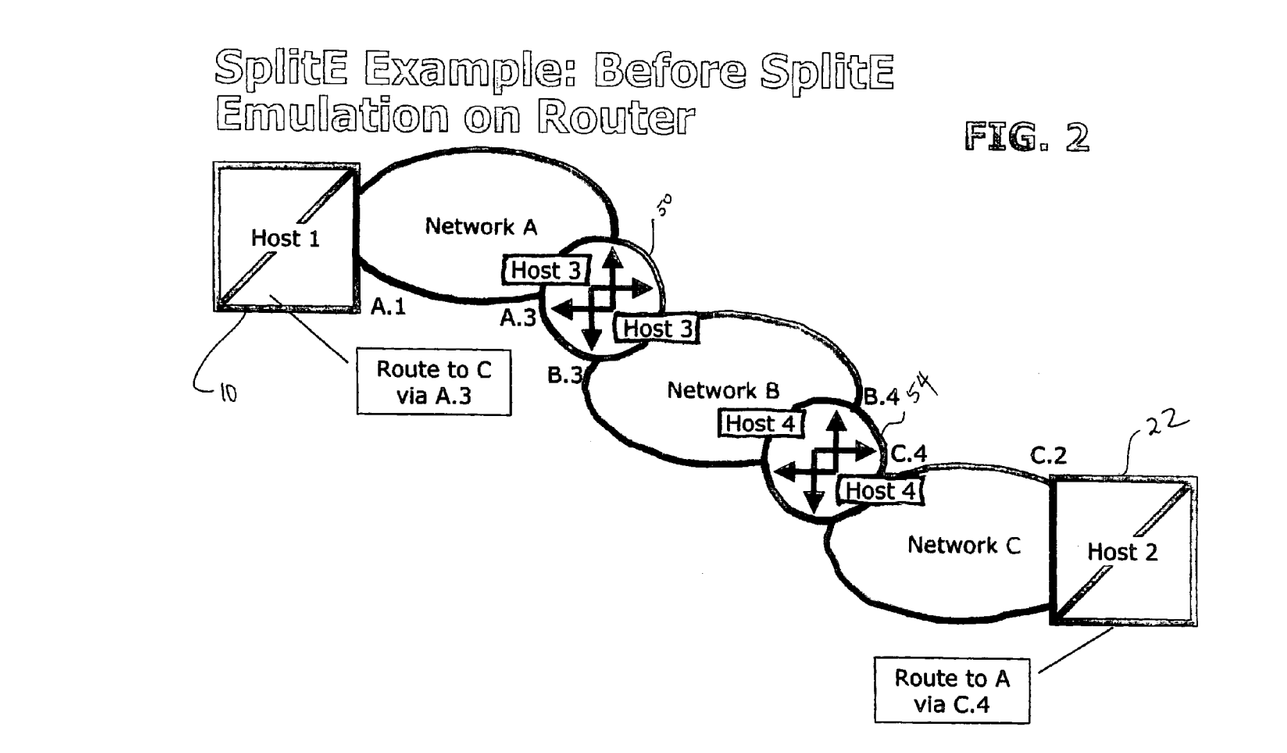
FIG. 2 depicts a network view before activation of SPLITE functionality in accordance with an aspect of the present invention.
Figure 3:
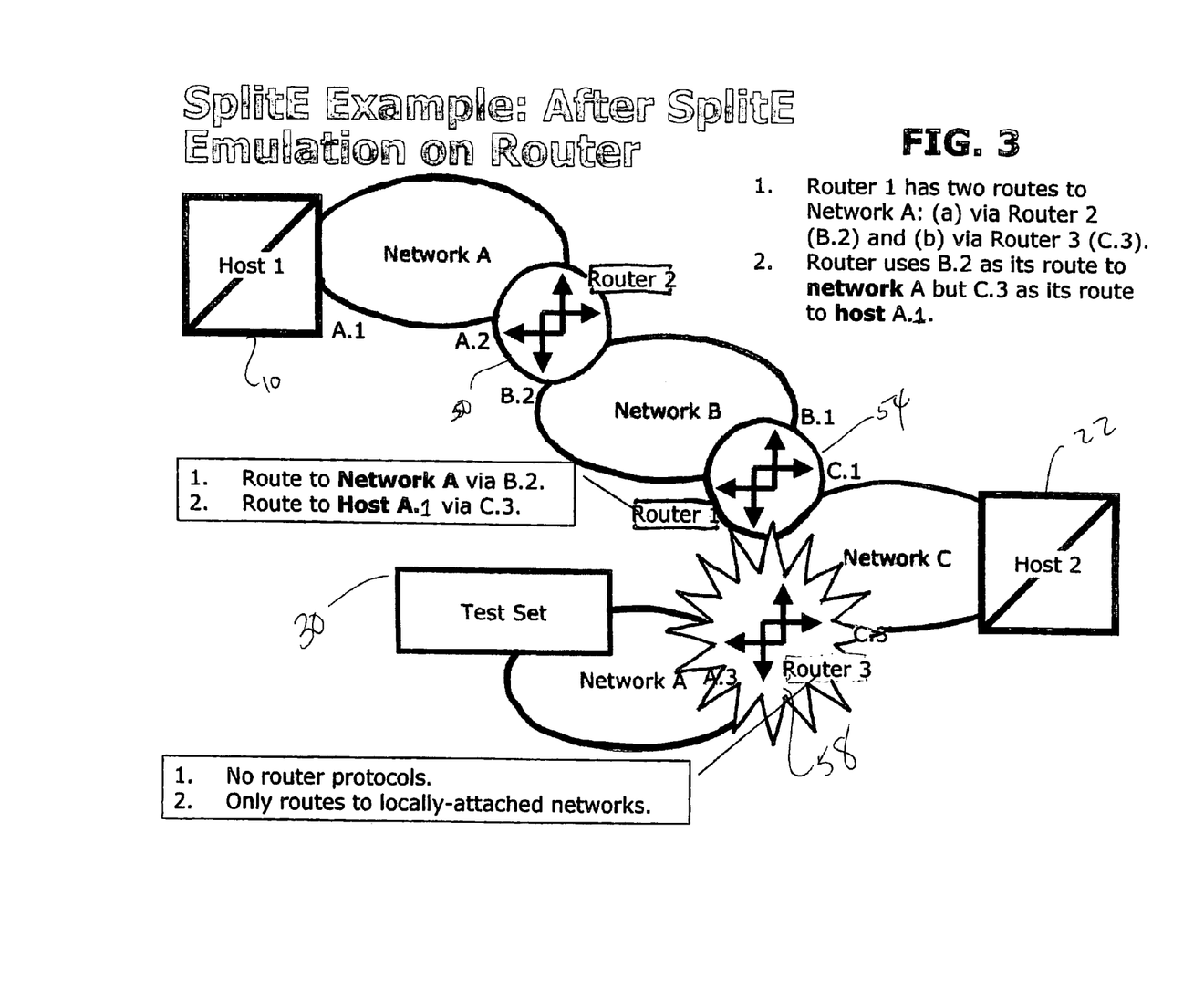
FIG. 3 depicts a network view after activation of SPLITE functionality in accordance with an aspect of the present invention.

Disabling the SPLITE function requires removing the second static route and disabling the filtering function. FIGS. 2 and 3 depict network views of SPLITE functionality in accordance with an aspect of the present invention. As illustrated in FIG. 2, the first host 10 is connected to the second host 22 through networks A, B and C. The entries A.1, A.3, B.3, B.4, C.4 and C.2 illustratively depict addresses on the respective networks. A third host or router 50 is located between networks A and B. A fourth host or router 54 is also located between networks B and C. As shown in FIG. 2, before activation of SPLITE functionality, first host 10 and second host 22 communicate using routers designated by the IP addresses or routing tables of third host or router 50 and fourth host or router 54. For example, the routing table of first host 10 would designate the next hop in routing packets destined for network C by directing those packets to router 50 via A.3. These packets would then reach router or third host 50. The routing table of router or third host 50 would include an entry that results in packets destined for second host 22 be sent over network B to router or fourth host 54 (i.e., the next hop). For example, the routing table of router or third host 50 would designate the next hop in routing packets destined for network C by directing those packets to router 54 via B.4. When router or fourth host 54 receives such packets, it determines the destination address from the packet header and based on its routing table entry sends the packets over network C to second host 22 (i.e., the next or last hop). Although only the router 54 (at host 4) is required, at least one other router is likely already in place. Therefore, the router 50 (at host 3) is shown as an example of where other routers might appear between the first host 10 and the router 54 and is not necessarily required to practice this aspect of the present invention.

When SPLITE functionality is emulated as shown in FIG. 3, second host 22 communicates with the test set 30 using a path through the router 54 and the router 58 and the test set 30 appears to be attached to network A. More particularly, as discussed above when SPLITE functionality is activated in router 54, the second static route is added to its routing table, modifying the first static route that results in packets being sent to the first host 10. The second static route indicates to router 54 that the path to host 10 is via router 58. As test set 30 is identified as host 10 by router 58, data packets from the host 22 destined for host 10 are routed to the test set 30. In this way, the test set 30 may be used to communicate test or other data packets to second host 22 to determine if it (second host 22) is operating as expected.

In accordance with this aspect of the present invention, SPILTE functionality may be used to troubleshoot and maintain a packet network. For example, if it is determined that second host 22 is unable to receive packets at a required level, the test set 30 may be used to test traffic performance at second host 22. If those tests reveal that host 22 is performing as expected, then SPLITF functionality may be used to determine if there is a problem with the facility. Note also that although SPLITE functionality is described with respect to second host 22, it may also be used to test first host 10 by configuring router 50 in a similar manner to that described for router 54 and providing a router (such as router 58) and a test set 30 relative to host 10 and router 50 as shown and described for host 10 and router 54.

Figure 4:
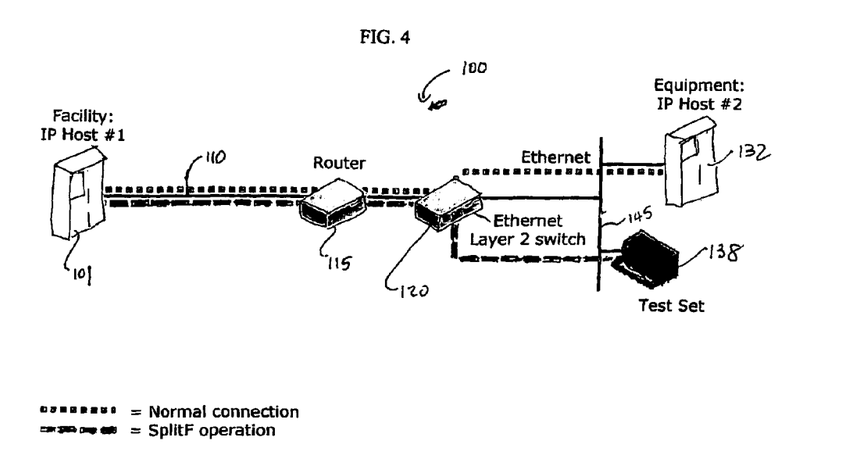
FIG. 4 illustratively depicts SPLITF functionality in a packet switched network.

FIG. 4 illustratively depicts an example of an implementation of SPLITF functionality in a packet network 100. As shown, the network 100, which may comprise multiple IP networks, preferably includes an IP host 101 coupled via uplink 110 to a first router 115. The first router 115 is connected to a second router 120. The second router is connected an IP host 132 and test set 138 via an Ethernet or layer 2 switch 145. SPLITF functionality is implemented by disconnecting the Ethernet port associated with IP host 132 and connecting the Ethernet port associated with test set 138.

SPLITF preferably includes functionality that enables the Ethernet switch/hub 145 to enable/disable connections to the test set 138 and to the IP host 132. In particular, since the switch 145 is logically adjacent to the IP host 132, the switch 145 attaches to the same physical interface of the router 120 as the test equipment 138, the router 120 can maintain its existing routing tables intact. The router 120 will, however, update its address resolution protocol (ARP) tables with the MAC (media access control) address of the test set 138 when the SPILTF function is enabled and IP Host 132 when the switch SPITF is disabled. For example, the ARP table may time out, the test set 138 may then send an ARP or PING, the router 120 then sends an ARP or PING, etc., until the ARP table is updated. The specifics as to how an ARP table may be updated are known to one skilled in the art and discussed in various publicly available references. In addition, one skilled in the art would recognize that PING is a computer network tool used to test whether a particular host is reachable across, for example, an IP network.

Enabling SPLITF functionality includes disabling the physical interface to the Ethernet switch 145 to which the IP Host 132 is connected and enabling the port on the switch 145 that is coupled to the test set 138. Disabling SPLITF conversely includes disabling the physical interface on the switch 145 connected to the test set 138 and enabling the port that is coupled to the IP Host 132.

As shown in FIGS. 1 and 4, the SPLITE and SPLITF functions may be implemented by configuring and operating a router and Ethernet switch as described. However, in general, SPLITF functionality can be implemented in an Ethernet switch logically adjacent to the equipment and a test set that is disconnected/connected from the facility that is being tested. Such functionality, as discussed above, may be achieved by enabling/disabling the respective ports on the Ethernet switch. On the other hand, SPLITE functionality can be implemented by providing an alternate network path to a facility through a different IP network and attaching a test set to the different network, as discussed above. SPLITE functionality is preferably implemented as software in a router. SPLITF functionality is preferably implemented as software in an Ethernet switch. In either case, the software may be stored on media or in memory and form at least part of the instructions used by a microprocessor, microcontroller or microcomputer to control such a router or switch. Alternatively, the instructions may be implemented in integrated circuitry such as ASICs (application specific integrated circuits) which are then incorporated in the equipment that makes-up the router, host or switch.

Figure 5:
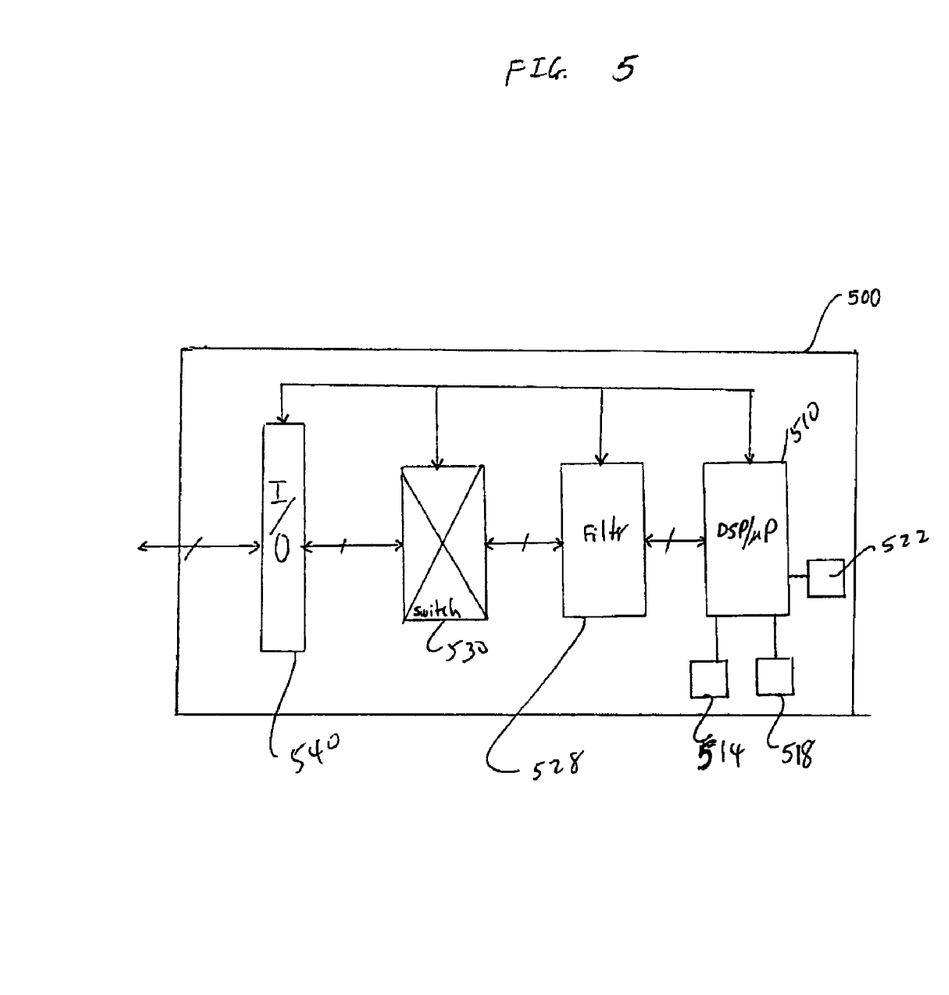
FIG. 5 illustrates an apparatus in accordance with an aspect of the present invention.

Turning now to FIG. 5, there is depicted a functional block diagram of an apparatus 500 in accordance with an aspect of the present invention. The apparatus 500 may comprise a router, host or packet switch. As shown, the apparatus 500 preferably includes a digital signal processor, microprocessor or controller 510. The microprocessor 510 is connected to read-only memory (ROM) 514 and a random access memory 518. Both these types of memories are known to those skilled in the art. The ROM 514 typically includes the instructions for operating the router 500 and would include the programs or code necessary to control the operation of the router in performing, for example, the SPLITE functionality described above. For example, the ROM 514 preferably stores the instructions for establishing a second static route, switching or directing traffic to the second static route and disabling the second static route and switching or directing traffic back to a first static route. The RAM 518 is the primary area used by the DSP/processor/controller 510 to manipulate the data associated with packets. For example, it may used to re-label the header information, e.g., destination address. A third memory 522 may serve as EEPROM for storing the routing tables, etc., associated with maintaining the static routes as defined by network operators.

The apparatus 500 also includes a packet filter 528. As described above, the packet filter 528 functions to drop packets from first host 10 destined for second host 22 when SPLTTE functionality is activated. In general, the packet filter 528 controls the flow of packets under the control of the DSP/processor/controller 510 by analyzing the incoming and outgoing packets and letting them pass or halting them based on, for example, the IP addresses of the source and destination.

A switch 530 is also provided within the apparatus 500. The switch 530 operates under the control of DSP/processor/controller 510 by directing the packets to the proper ports on the input/output interface 540.

With reference to FIGS. 1 and 5, and assuming that router 15 is implemented as shown in FIG. 5, SPLITE operates as follows. The processing block 510 establishes and stores routing tables in, for example, EEPROM 522. For example, a first static route is stored that points to the network of IP host 10 and references the next-hop gateway on the first router's 15 uplink 40 interface. The first static route is used during normal operation. A second static route is stored in EEPROM 522 and points to the IP address of IP host 10 (but not the entire network) and references the second router 20 as the appropriate next-hop gateway to reach IP host 10's address. Thus, when SPLITE is activated, the processing block 510 retrieves static route from the EEPROM 522 and instructs the switch 530 to route packets to IP host 10 via I/O ports 540 such that those packets traverse router 15 and router 20 on their way to the test set 30. In addition, in order to prevent queries and responses from IP host 10 from reaching IP host 22, the processing block 510 instructs filter 528 to block (i.e., drop) packets received from IP host 10 on the uplink 40 interface and destined for IP host 22. In this way, an operator may then use test set 30 to test the link between router 15 and host 22.

Once testing is completed, SPLITE functionality is then deactivated. As a result, the processing block retrieves the first static route from EEPROM 522 and uses to then transport packets between the hosts 10 and 22 thereby establishing a normal or non-SPLITE traffic flow. Although in the foregoing description both static routes are described as being stored, it is also possible to store only the primary static route, i.e., the route defined for normal traffic flow and overwrite in real time that route with the second static route. In this case, the second static route can be defined by a network operator as part of the testing sequence.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for testing packet switched networks, comprising:

establishing a first network path associated with a first device and a local device, the first network path including at least a first router, a second router and a data link layer switch, the first device being on a first network;

establishing, in the first router, a first static route along the first network path, the first static route pointing to the first network and referencing a first next-hop gateway associated with a first logical path to the first device;

establishing, in the first router, a second static route along the first network path, the second static route pointing to an address of the first device and referencing the second router as a second next-hop gateway associated with the first logical path to the first device;

preventing any packets received at the first router from the first device via the first static route to reach the local device;

allowing packets received at the first router from the first device via the second static route to reach the local device; and directing packets sent by the local device and destined for the first device to a test set using the second static route.

2. The method of claim 1, wherein establishing a second static route includes establishing the second static route via a user command executed on the first router.

3. The method of claim 1, further comprising disabling the second static route, re-establishing the first static route and allowing any packets received via the first static route to reach the local device.

4. The method of claim 1, wherein establishing the second static route comprises retrieving a routing table from a memory.

5. The method of claim 1, wherein establishing the second static route comprises modifying the first static route in a routing table with the second static route.

6. The method of claim 1, further comprising sending test packets from the test set to the local device using the second static route.

7. An apparatus, comprising:
  a memory for storing a first static route used for routing packets between a remote device, the remote device being on a first network, and a local device over a first network path and a second static route used for routing packets between the remote device and the local device over a second network path, the first static route pointing to the first network and referencing a first next-hop gateway in an uplink facility for communicating with the remote device, and the second static route pointing to an address of the remote device and referencing a second apparatus as a second next-hop gateway in a downlink facility for communicating with the remote device, wherein the apparatus is coupled to the remote device via the uplink facility and is coupled to the second apparatus via the downlink facility;
  a packet filter for dropping packets received from the remote device and destined for the local device; and
  a processor for controlling the memory and packet filter, the processor executing instructions comprising:
    modifying the first static route with the second static route,
    controlling the packet filter to drop packets received from the remote device via the first static route and destined for the local device,
    routing packets received from the remote device over the second static route to the local device; and
    directing packets sent by the local device and destined for the remote device to a test set over the second static route.

8. The apparatus of claim 7, wherein the apparatus comprises a router.

9. The apparatus of claim 7, wherein the apparatus comprises a host.

10. The apparatus of claim 7, wherein the apparatus comprises a packet switch.

11. A system for implementing path splitting in a packet network, comprising:
  a first router coupled to a first host via an uplink facility, the first host being on a first network;
  a second router coupled to the first router via a downlink facility; and
  a switch coupled to the second router, a second host and a test set, the switch being operable to switch information at the data link layer, and wherein the first router includes a first static route pointing to the first network and referencing a first next-hop gateway in the uplink facility for communicating with the first host, a second static route pointing to an address of the first host and that references the second router as a second next-hop gateway for communicating with the first host, a filter for filtering packets received from the first host on the uplink facility, and a processor executing instructions comprising:
    dropping packets received from the first host via the first static route and destined for the second host,
    routing packets received from the first host over the second static route to the second host; and
    controlling the filter to direct packets sent by the second host to a test set over the second static route.

12. The system of claim 11, wherein the first router appears on the first network, the first network being distinct from a second network on which the second router appears.

13. The system of claim 11, wherein the first router and second host appear on the same network.

* * * * *